C. H. TERRY & W. W. GREEN, Jr.
Picket-Fence.

No. 209,089.                         Patented Oct. 15, 1878.

WITNESSES.
D. P. Cowl
L. Bacon

INVENTORS.
C. H. Terry and W. W. Green Jr.
per Chas. H. Fowler
Attorney.

UNITED STATES PATENT OFFICE.

CHARLES H. TERRY AND WILLIAM W. GREEN, JR., OF CHICAGO, ILLINOIS.

IMPROVEMENT IN PICKET-FENCES.

Specification forming part of Letters Patent No. 209,089, dated October 15, 1878; application filed August 7, 1878.

*To all whom it may concern:*

Be it known that we, CHARLES H. TERRY and WILLIAM W. GREEN, Jr., of Chicago, in the county of Cook and State of Illinois, have invented a new and valuable Improvement in Picket-Fences; and we do hereby declare that the following is a full, clear, and exact description of the construction and operation of the same, reference being had to the annexed drawings, making a part of this specification, and to the letters and figures of reference marked thereon.

Figure 1:
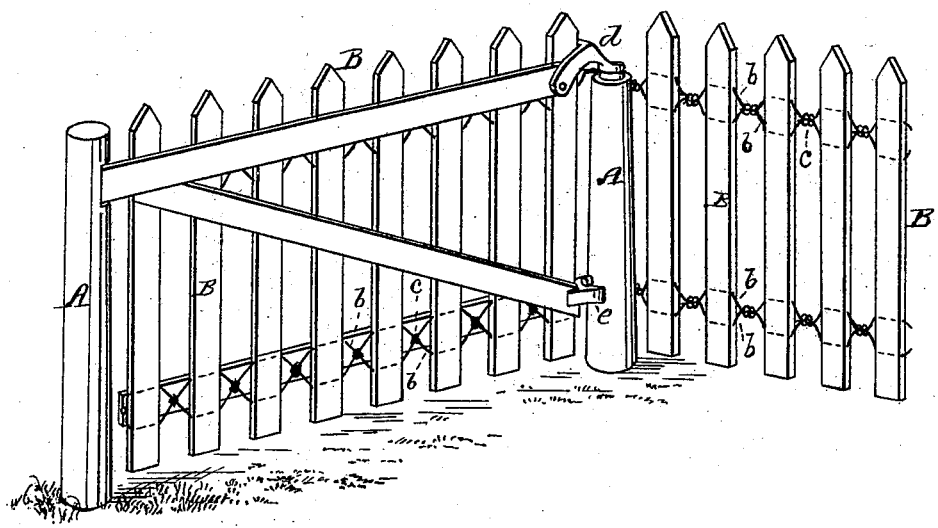
Figure 2:
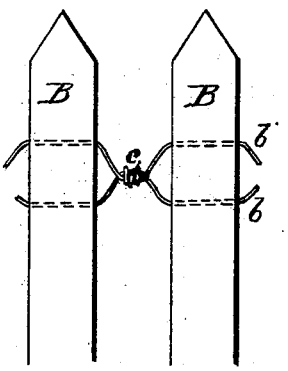
Figure 3:
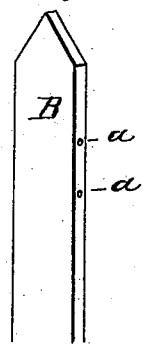

Figure 1 of the drawing is a representation of a perspective view of our invention. Fig. 2 is a detached view of two of the pickets, showing the manner of connecting them together. Fig. 3 is a perspective view of one of the pickets.

This invention has relation to that class of fences which are composed of a series of pickets secured together, and at a suitable distance apart, by two or more wires. Previous to our invention the wires for holding and supporting the pickets were secured thereto by passing around the same, or were made to engage with oblique notches upon the sides of the pickets. It has been found that after a short time the wires would become disengaged with the oblique slots, resulting in the pickets falling out of place, making a very unsightly appearance, and no longer forming a protection to the land around which the fence is constructed.

The object of our invention is not only to remove the above objections, but to connect the wires to the several pickets in a manner that will admit of their being rigidly secured in place, and at the same time render the construction of the fence simple and durable, with the pickets placed at the desired distance apart and firmly secured, with comparatively little trouble, as will be hereinafter described.

In the accompanying drawings, A represents the posts ordinarily used for fences and gates, and which are placed a suitable distance in the ground. The pickets B may be composed of wood or other suitable material, and of any desired width, length, or thickness. These pickets have holes $a\ a$ near the top and bottom thereof, and running in a direction with the width of the picket. These holes may be made by suitable tools or machinery, and should be a sufficient distance apart, so that when the wires are passed through them the latter will form trusses for the support of the pickets.

The wires $b\ b$, which may be of any suitable metal, are passed through the holes $a\ a$, or, in other words, the pickets are "strung" on the wires, and afterward said wires are bent at a double angle, the apex of the angle of each wire passing each other to form an eye, through which passes a short wire, $c$, the ends being bent in opposite directions around the two wires $b\ b$, which firmly hold them together. If desired, the points or ends of the wires $c$ may be sharp, and the projecting ends of sufficient length to form barbs.

In further describing the advantages of our invention it will be noticed that as the wires $b\ b$ pass directly through the pickets there is no danger of their becoming disconnected from the wires; and the manner of bending the wires and forming an eye for the reception of the short wire prevents each or either of the wires $b$ from being drawn out of place, thereby preserving the distance between the pickets, and preventing the latter from being laterally displaced or slipping sidewise upon the wires.

It is evident that our invention is equally applicable to gates constructed with a series of pickets, as will be seen by reference to Fig. 1 of the drawings, the wires $b\ b$ passing around the upper hinge, $d$, so as to obtain all the strain on the entire length of the gate, the brace coming in contact with the lower hinge, $e$, preventing it from sagging.

Should it be desired, the pickets strung upon the wires may be sold in the market, and in this case all that is necessary is to bend the wires as previously described, and connect them by the short wires, and properly adjust the pickets the desired distance apart, which may be readily done without the annoyance of having the pickets continually falling out of place or being accidentally disconnected from the wires.

Having now fully described our invention, what we claim as new, and desire to secure by Letters Patent, is—

1. A picket-fence the several pickets of which are secured together by two or more wires passing directly through the same, and disposed at an angle between the pickets to form a truss, substantially as and for the purpose set forth.

2. The pickets B, supported by the wires $b$, passing directly through the same and bent at a double angle, the apex of each angle passing the other to form eyes, through which pass short wires $c$, bent around the wires $b$, to form a truss for the pickets, substantially as and for the purpose described.

In testimony that we claim the above we have hereunto subscribed our names in the presence of two witnesses.

CHARLES H. TERRY.
    WILLIAM W. GREEN, JR.

Witnesses:
  F. A. JOHNSON,
  R. H. LEE.